Feb. 25, 1930. J. CLAUDE 1,748,061
STEERING GEAR FOR MOTOR VEHICLES
Filed June 4, 1927 2 Sheets-Sheet 1

Inventor
Josef Claude,
By Henry Orth Jr Atty.

Feb. 25, 1930.  J. CLAUDE  1,748,061
STEERING GEAR FOR MOTOR VEHICLES
Filed June 4, 1927   2 Sheets-Sheet 2
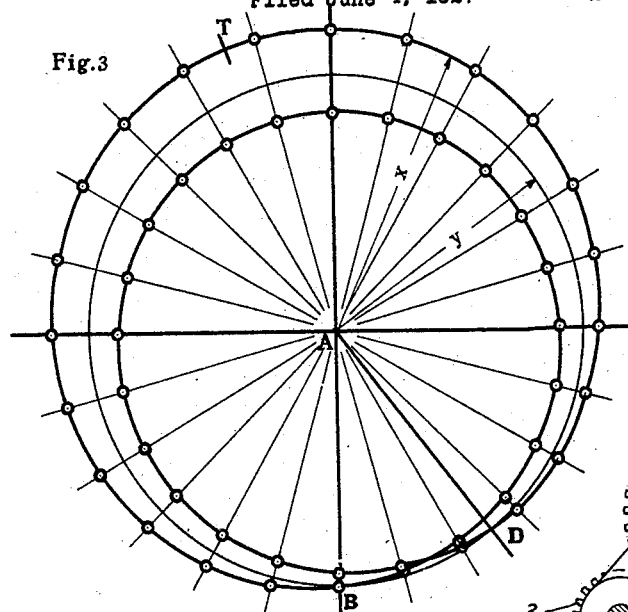
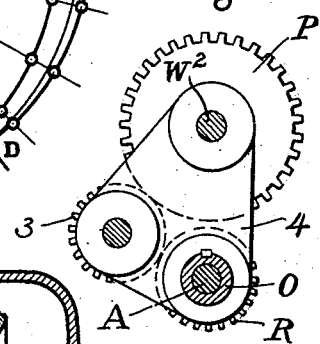
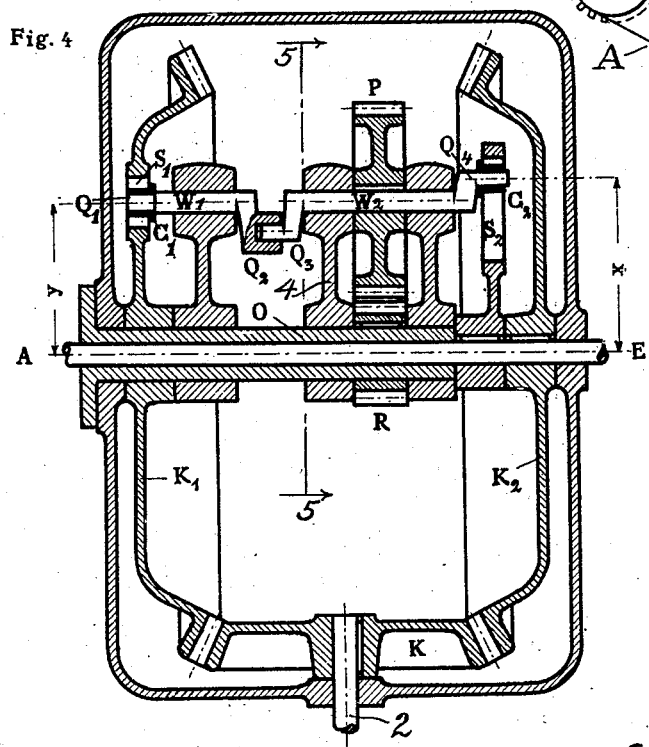
Inventor
Josef Claude,
By Henry Orth
att.

Patented Feb. 25, 1930

1,748,061

UNITED STATES PATENT OFFICE

JOSEF CLAUDE, OF FRANKFORT-ON-THE-MAIN, GERMANY

STEERING GEAR FOR MOTOR VEHICLES

Application filed June 4, 1927, Serial No. 196,495, and in Germany April 5, 1927.

This invention relates to the steering of motor vehicles and more particularly to steering gear for turning vehicle wheels by means of cams permitting a pure rolling movement of the wheels.

Known arrangements for turning vehicle wheels mounted on stub axles suffer from the disadvantage that they allow of a very limited steering lock or else they produce skidding of the wheels in turning on curves. Attempts to avoid these disadvantages have resulted in a large number of suggested constructions none of which, however, attain the desired object of permitting a pure rolling movement of all wheels with a full lock because the known theoretical requirement that the difference in the cotangents of the turning angles of both steering wheels must always remain the same, can only be satisfied by constructions which are founded on exact calculations. Although the final solution of the problem would appear to be a matter of construction, the path to the solution is by way of problem which must be considered as unsolved such as the determination of the method of calculating the steering cams, their development and optimum form and, connected therewith, the form of the gearing which as the support or the generator of the steering cams transmits the movement to the steering wheels of the vehicle in suitable manner.

The known relation cotangent $\alpha$ — cotangent $\beta - \dfrac{b}{l}$ is not alone sufficient for the determination of the form of the steering cams. In the formula $b$ the distance apart of the pivotal points of the steering pivots is known as also is $l$, the distance of the steering axle from the fixed axle. $\alpha$ and $\beta$ are the variable but interdependent pair of angles through which the steering wheels turn.

Figure 1:
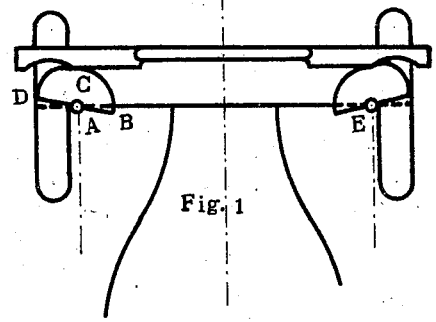
Figure 2:
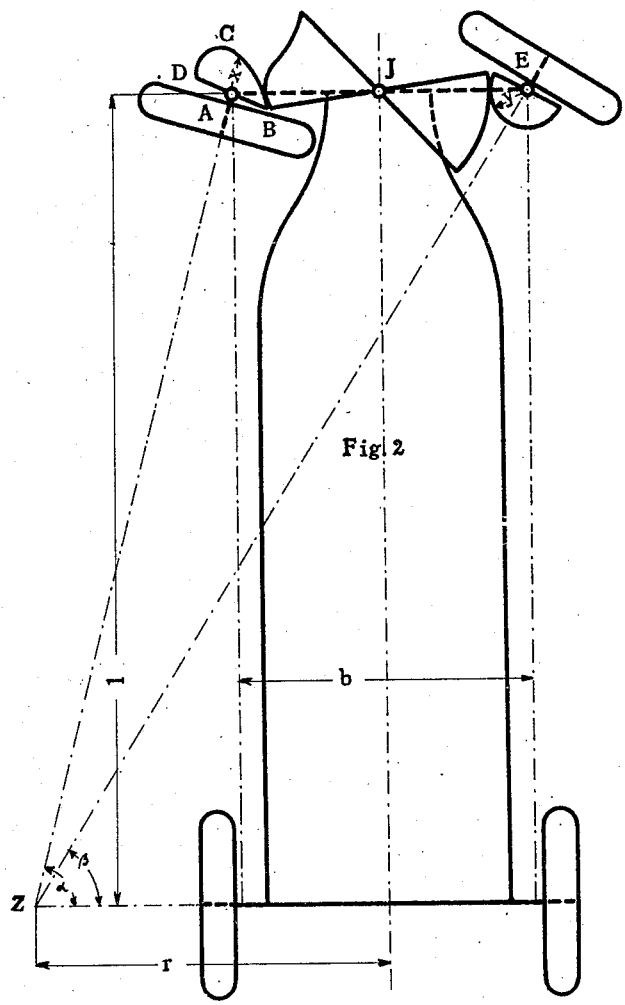

Hitherto a further relation of these angles has not been recognized, for example, their dependence on the steering cams, although as is subsequently explained the problem is based on the determination of this equation. That such a relation exists is clear from the accompanying drawings in which Fig. 1 shows the wheels with the new cam mechanism and a cam bar drive. Fig. 2 discloses the theoretical construction of the cams. Fig. 3 is a view showing a development of the cams while Fig. 4 illustrates an embodiment of the gearing illustrated diagrammatically in Fig. 3. Fig. 5 is a section on line 5—5 Fig. 4.

In Fig. 2 $\sin \alpha = \dfrac{1}{AZ}$ and $\sin \beta = \dfrac{1}{EZ}$. AZ and EZ are the interdependent radii at any moment about which the steering wheels roll. These obviously fulfil all conditions required of the radii of curvature $x$ and $y$ of the steering cams to be determined. It is therefore also required to fix these dimensions proportionately so that $AZ:EZ=x:y$ from which it follows that $\sin \alpha : \sin \beta = x : y$ i. e., the sines of the angles through which the steering wheels turn are inversely proportional to the radii of curvature of the steering cams to be found.

These two relations now facilitate the determination of the form of the steering cam of one steering wheel if the steering cam of the other wheel is assumed to be known, for example, an arc of a circle, i. e., has a constant radius of curvature. The possibility of calculation offers the key to the improved construction which may vary widely both with regard to the shape of the cams as also with regard to their construction.

Figs. 1 and 2 of the drawing are diagrams given by way of example and indicative of the arrangement of the steering mechanism. The associated angular positions of the stub axles at one time are indicated for simplicity of explanation by their vectors, that about the pivot A by the vector $x'$, $x^2$ and so on, that about the pivot E by the vector $y'$, $y^2$ and so on.

In the embodiments illustrated in Figs. 2 and 3 the radial vectors $y$ which are constant indicate their direction and the corresponding directional vectors $x$ their dimensions.

In Fig. 1 a part only of the steering cams has been determined in the above manner and has been transferred to the remaining part of the opposite steering cams. No objection exists to the use of cams on both steering wheels of a form which deviates throughout from circular form if it satisfies the requirements of the calculation.

The intermediate member controlling the turning movement of the two steering wheels may take any suitable form. The diagrams given are only to be considered as selected examples of a great number of possible constructions which differ in part from structurally similar known arrangements only in the characteristic based on the calculation of the cams so as to provide steering free from objection, a characteristic to which all previous constructions can make no claim because of the absence of sufficient data for calculation.

The movement may be transmitted from the cams to the wheels direct as indicated in Figs. 1 and 2 or may be transmitted indirectly as in Figs. 3 and 4 and as hereinafter described. In the diagram, Fig. 3, as in Fig. 2, the vectors $x$ indicate the length with the direction given and the vectors $y$ the direction with the length assumed constant. The diagram represents a so-called extension of the cams over, for example, 720°, i. e., the cams shown in Fig. 2 providing a steering lock of 180° are here extended to four times 180° and accordingly the extension produced is later reduced by means of gearing to the original lock of the steering wheels.

In the mid-position AB for the vector $x$ and AD for the vector $y$ shown in the diagram the steering wheels are arranged for running in a straight line or in zero position, because in this position the angles $\alpha$ and $\beta$ are 0°. The mid-position for the vector $x$ or $y$ coincides with the end positions of the vectors $y$ or $x$ for the minimum left and right hand curves. The point indicated by T corresponds to the steering position of the gearing shown in Fig. 4. The cams may, however, be extended to any other angle.

The extension serves a number of purposes. It permits of the production of a steering gear satisfying practical requirements, affords fourfold exactitude in the transmission, simplified and exact production of the gear elements, favourable power demands on the latter and consequently great reliability in handling or steering the vehicle. All the assumptions and determinations of vector dimensions shown in Figs. 1, 2 and 3 can be made in the same manner both for $x$ and for $y$.

Fig. 4 of the drawing illustrates, by way of example, an embodiment of the extended steering diagram shown in Fig. 3 of the drawing and an explanation with the aid of that drawing may serve to assist in an understanding of the steering gear. In this figure the two shafts A and E are geared or otherwise connected to the pivot wheels of a vehicle to cause them to turn on their pivots for steering. The particular manner of connection forms no part of my invention. A steering post 2 operated by hand and extending to the driver's position carries a bevel wheel K.

Two bevel pinions $K'$ and $K^2$ are driven by bevel pinion K in opposite directions of rotation and transmit their rotary movement through the shafts A and E leading to the steering pivots of the steering wheels of the vehicle, the one bevel pinion $K^2$ transmitting its movement directly through shaft E, and the other $K'$ through the medium of crank and planet gears and shaft A. The crank and planet gears are rotatably mounted on a common non-rotating sleeve O and are eccentric to a definite extent, not indicated in Figs. 4 or 3, to the axis leading to the pivots at the ends of shafts A and E. In a slot $S'$ in the bevel pinion $K'$ slides a block $C'$ which by means of a pin $Q'$ mounted therein on an extension of the crank shaft $W'$ imparts a rotary motion at the lever arm Y about the fixed sleeve O. Crank shaft $W'$ is connected by means of crank $Q^2$ through crank $Q^3$ with the second crank shaft $W^2$ and this through crank $Q^4$ and, through the medium of the slide block $C^2$ and a slotted lever $S^2$ mounted on the shaft A, connected with one of the steering wheels. On the crank shaft $W^2$ is also secured a planet pinion P rotating about the fixed sleeve O at the lever arm $y$. It rotates simultaneously $W^2$ in the reverse direction to the bevel pinions from a pinion R connected with the axis O through the medium of a pinion 3 mounted in a frame 4 loose on sleeve O, Fig. 5 in such manner that the crank pin $Q^4$ describes the extended steering as shown in Fig. 3. It effects indirectly a differential movement between $Q^4$ and $Q'$ which according to the dimensions of the lever arms and pinions corresponds to the differential movement required for the two steering or front wheels.

In the above described arrangement three cranks have been taken by way of example. Similar constructions for the same purpose can be made having different numbers of cranks.

The steering gear shown in Fig. 4 does not differ in principle from the steering gear shown in Figs. 1 and 2. The bevel pinion $K^2$ is the support of the circular steering cam corresponding to the cam disc E. The bevel pinion $K'$ with its driving parts is a generator of the steering cam calculated from the relations:—cotangent $\alpha$—cotangent $\beta = \frac{b}{l}$ and sin $\alpha$ : sin $\beta = x : y$ corresponding to the cam disc A. The bevel pinion K is the intermediate member controlling the two bevel pinions $K'$ and $K^2$ in dependence on one another corresponding to the cam disc J in Fig. 2 or the cam bar replacing it in Fig. 1.

Steering gear based on this mathematical foundation and fulfilling the theoretical requirements has the following advantages over known steering gear.

The free rolling of all the wheels involves minimum wear both of the tires and of the road. The swinging movement of the rear part of the vehicle which occurs in rapid turning particularly on sharp curves due to the skidding of separate wheels is avoided; the lock of the vehicle is unlimited so that it can be manœuvred easily in narrow spaces; an ideal steering is produced and an easily handled steering gear is produced. The construction affords the maximum reliability in operation in consequence of the uniform stress on the steering gear in all steering positions. The improved steering gear can also be employed for vehicles having more than two axles.

I claim:—

1. Mechanism for operating the steering wheels of vehicles, comprising two alined shafts, a miter wheel secured to one shaft and a similar miter wheel loose with respect to the other shaft, a miter pinion to oppositely rotate said wheels, a slotted arm secured to said other shaft, a crank shaft mounted parallel to the alined shafts, said crank shaft driven from said loose bevel wheel, the crank of which shaft engages in the slot of said arm, and a reversing mechanism operated by said crank shaft to reversely drive said other shaft.

2. Mechanism for operating the steering wheels of vehicles; comprising two alined shafts each for operating a steering wheel, a miter wheel fast on one shaft, a stationary sleeve for the other shaft, a similar miter wheel loose on said sleeve, a miter pinion for reversely driving said wheels, a slotted arm secured to said other shaft, a sun gear secured to said sleeve, a frame loose on the sleeve, a crank shaft revolved by said similar mitre wheel, a crank shaft mounted in said frame and whose crank engages the slot of said arm, a planet wheel fast on the latter crank shaft, a loose gear wheel meshing with both sun and planet gears, and a crank of one crank shaft engaging with a crank of the other crank shaft.

In testimony that I claim the foregoing as my invention, I have signed my name.

JOSEF CLAUDE.

CERTIFICATE OF CORRECTION.

Patent No. 1,748,061.                          Granted February 25, 1930, to

JOSEF CLAUDE.

It is hereby certified that error appears in the above numbered patent requiring correction as follows:
In the drawings, Sheet 2, Fig. 4, should appear as shown below instead of as shown in the drawings;

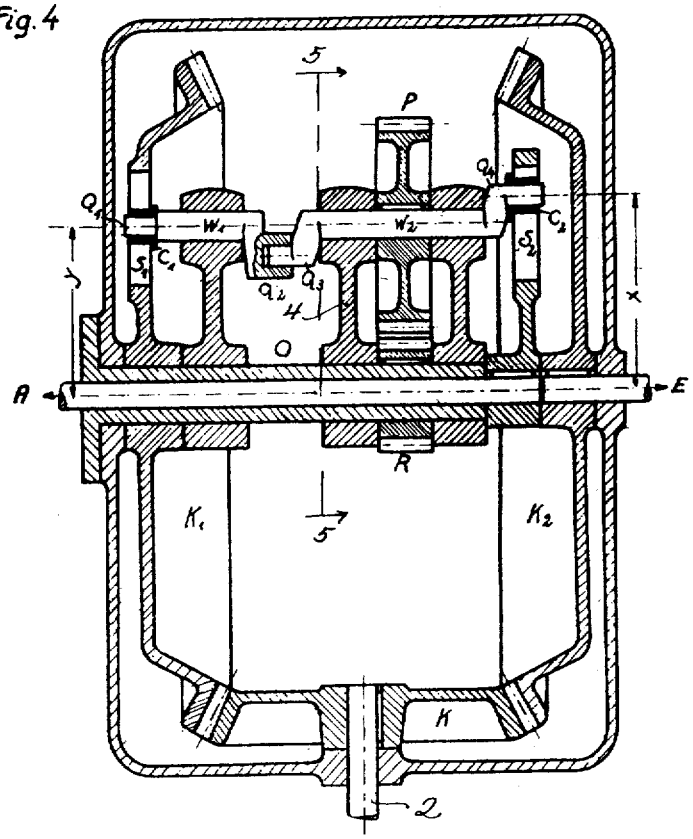

and that the said Letters Patent should be read with this correction therein that the same may conform to the record of the case in the Patent Office.

Signed and sealed this 24th day of June, A. D. 1930.

M. J. Moore, (Seal)                                                      Acting Commissioner of Patents.